United States Patent [19]
Kanakia et al.

[11] Patent Number: 5,594,729
[45] Date of Patent: Jan. 14, 1997

[54] SYSTEM AND METHOD FOR EMPLOYING SINGLE-BIT FEEDBACK CONTROL WITHIN A VARIABLE BIT RATE DATA TRANSMISSION NETWORK

[75] Inventors: Hemant R. Kanakia, New Providence; Partho P. Mishra, Chatham, both of N.J.

[73] Assignee: Lucent Technologies Inc., Murray Hill, N.J.

[21] Appl. No.: 311,079

[22] Filed: Sep. 23, 1994

[51] Int. Cl.⁶ .................................................. H04L 12/56
[52] U.S. Cl. ........................... 370/391; 370/395; 370/468
[58] Field of Search ................................. 370/17, 60, 84, 370/94.1, 79, 103; 364/717; 455/68, 69; 341/143; 375/358

[56] References Cited

U.S. PATENT DOCUMENTS

| | | | |
|---|---|---|---|
| 5,128,998 | 7/1992 | Kurihara | 364/717 |
| 5,317,563 | 5/1994 | Oouchi et al. | 370/17 |
| 5,335,224 | 8/1994 | Cole et al. | 370/84 |
| 5,361,252 | 11/1994 | Sällberg et al. | 370/17 |
| 5,361,253 | 11/1994 | Feijen et al. | 370/17 |
| 5,367,523 | 11/1994 | Chang et al. | 370/94.1 |
| 5,412,587 | 5/1995 | Holt et al. | 364/717 |
| 5,426,635 | 6/1995 | Mitra et al. | 370/84 X |

*Primary Examiner*—Benedict V. Safourek
*Attorney, Agent, or Firm*—Thomas Stafford; Robert P. Marley

[57] ABSTRACT

The invention conveys network related information utilizing a single bit within a data cell. This is facilitated through a statistical analysis of a plurality of such single bits collected over a period of time from multiple data cells, and provides a level of intelligence beyond a simple indication of whether or not a particular parameter has exceeded a preset threshold. Thus a switch compiling such information can convey more accurate statistical information with respect to a varying parameter related to data cells (such as queue size, current transmission rate or link utilization) being sent to the various receivers within the network. Each receiver can then apply a suitable filter to the stream of received bits to extract the appropriate information, and send that information back to the source. In response, the source adapts the transmission rate or amount of data cells being sent to the switch accordingly.

13 Claims, 2 Drawing Sheets

5,594,729

SYSTEM AND METHOD FOR EMPLOYING SINGLE-BIT FEEDBACK CONTROL WITHIN A VARIABLE BIT RATE DATA TRANSMISSION NETWORK

TECHNICAL FIELD

The invention relates to the transmission of information and, more particularly, to improving information transmission capabilities asynchronous transfer mode ("ATM") and other variable bit rate networks.

BACKGROUND OF THE INVENTION

The promise of a broadband integrated services digital network has led to the study of mechanisms for efficient transport of real-time compressed data (especially video data) in packet switching networks. Two principal approaches have emerged. One approach is for the network to offer guarantees of constant bandwidth to each data connection—Such connections are sometimes referred to as constant bit rate transmission channels. An alternative approach is for the network to provide information via variable bit rate transmission channels. This approach utilizes network resources more efficiently than constant bit rate channels by exploiting packet-switching and the inherent variations or bursts of the data being transmitted (such variations are particularly evident in video data). Variable bit rate channels can provide a constant quality signal to end users, assuming that the values of the encoding parameters remain constant and there is no loss of information due to packet losses. However, the bandwidth provided by a packet-switched network is in general time-varying. As long as a network is lightly loaded, it has the bandwidth available to carry the variable bit rate stream at a constant quality, however, under heavy loads there could be loss of information due to buffer overflows or excessive data delays. The degradation of signal quality due to such overloads can be reduced by providing congestion control mechanisms.

ATM networks, a specific class of variable bit rate transmission channels, impose special constraints on the choice of control mechanisms, mainly due to the small fixed cell size. The small cell size places a premium on the number of bits that may be used in the header for control purposes. With respect to congestion control, the small ATM header size has meant that there is only one bit, called the Forward Explicit Congestion Notification ("FECN") bit, available for indicating congestion information in every data cell going in the forward direction (i.e. from a sender to a receiver). The small ATM cell size also reduces the cell processing time available at a switch, and thereby effectively limits the use of sophisticated algorithms at a switch for the purpose of congestion avoidance.

As a result, there is still much debate on the choice of appropriate congestion control mechanisms for data and video traffic in ATM networks. Two approaches for providing network congestion control were disclosed by K. K. Ramakrishan and R. Jain in "A binary feedback scheme for congestion avoidance in computer networks," *ACM Transactions on Computer Systems*, 8(2), pages 158–181, May 1990. In one of the approaches a switch is adapted to set a single bit in a cell header to indicate congestion when the average queue length at the switch at the time the cell arrives is greater than or equal to a particular fixed threshold. The other approach disclosed by Ramakrishan and Jain employs a hysteresis algorithm that involves two thresholds. A single bit within a cell header is set to indicate congestion after the average queue occupancy crosses the higher threshold, and once this higher threshold is crossed, the cell header bit continues to be set until the average queue occupancy reaches a lower threshold.

Another single bit based feedback control scheme is described in co-pending and commonly assigned U.S. patent application Ser. No. 118,531, "Method For Adaptive Control Of Windows And Rates In Networks," which was filed on Sep. 8, 1993, now U.S. Pat. No. 5,426,635 issued Jun. 20, 1995. This application shows a system wherein each switch along a path in a virtual circuit periodically provides queue occupancy information by setting a single bit in response to the instantaneous queue occupancy level. This set bit provides information used to adjust the amount or rate of information being sent to the switch by the sources within the circuit.

Unfortunately, these prior one-bit feedback schemes fail to provide information reflective of anything more than the instantaneous level of a monitored parameter being above or below a particular threshold.

SUMMARY OF THE INVENTION

The present invention utilizes a single bit within a data cell to convey network-related information. This is facilitated through -a statistical analysis of a plurality of such single bits collected over a period of time from multiple data cells, and provides a level of intelligence beyond a simple indication of whether or not a particular parameter has exceeded a preset threshold. Thus a switch compiling such information can convey more accurate statistical information with respect to a varying parameter related to data cells (such as queue size, current transmission rate or link utilization) being sent to the various receivers within the network. Each receiver can then apply a suitable filter to the stream of received bits to extract the appropriate information, and send that information back to the source. In response, the source adapts the transmission rate or amount of data cells being sent to the switch accordingly.

DETAILED DESCRIPTION OF THE INVENTION

Figure 1:
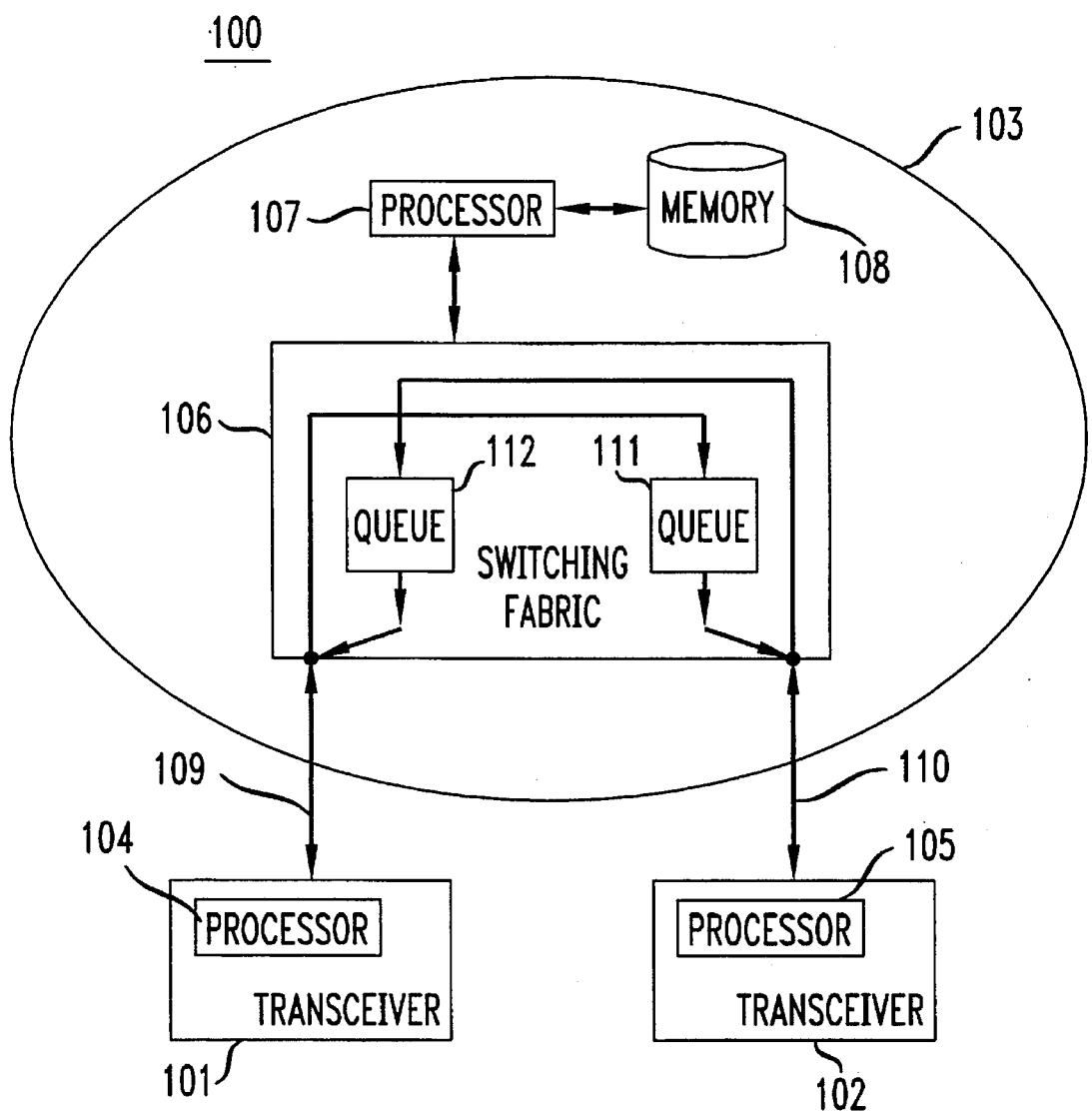
FIG. 1 is a simplified block diagram of an ATM data transmission network that facilitates the practice of the invention.

FIG. 1 shows a simplified block diagram of an exemplary ATM data transmission network 100 facilitating the practice of the invention. As shown, network 100 provides for the transmission of data between transceivers 101 and 102 via switch 103. Both of these transceivers includes a processor (104 and 105). Switch 103 is a programmable ATM switch that includes switching fabric 106, processor 107, and memory 108. Such switches are available commercially, one example being the Globe View 2000 ATM switch, manufactured by AT&T. Switch 103 is configured to accept data from and transmit data to transceivers 101 and 102 via switching fabric 106. The handling of data, and the generation of header information within switch 103 is directed by processor 107.

Within network 100, data received at switch 103 for transmission from one transceiver to another is processed in first-in-first-out service discipline, employing a single queue for each direction of transmission. As is typical for an ATM switch, switch 103 is adapted to effect many different logical connections, each of which may have a different sender and receiver.

A data packet, n, being transmitted from transceiver 101 (source) to transceiver 102 (recipient) is propagated along line 109 to switch 103 and therein to switching fabric 106 at rate of $\lambda_n$. As shown, switching fabric 106 includes a queue for each direction of transmission between transceivers 101 and 102, namely, queue 111 for transmission from transceiver 101 to transceiver 102 and queue 112 for transmission from transceiver 102 to transceiver 101. The header data packet n includes a single FECN bit in an un-set or logical zero state. This data packet arrives at switch 103 at time t, and the amount of data waiting in the queue at switch 103 at time t is denoted as $\tilde{x}_n$. The service rate of the connection (i.e., the rate at which the data is delivered to a recipient transceiver via network 100), is $\mu$.

Stored within memory 108 is a logical table associating increasing levels of queue occupancy ($\tilde{x}_1$ through $\tilde{x}_{max}$) with a range of weighted values, P (where $0 \leq P \leq 1$ and $\Sigma P=1$). Table I, below provides a representation of an example of one such logical table.

TABLE I

| queue occupancy level | P |
|---|---|
| $0 \leq \tilde{x}_n \leq \tilde{x}_1$ | 0.00 |
| $\tilde{x}_1 < \tilde{x}_n \leq \tilde{x}_2$ | 0.15 |
| $\tilde{x}_2 < \tilde{x}_n \leq \tilde{x}_3$ | 0.20 |
| $\tilde{x}_3 < \tilde{x}_n \leq \tilde{x}_4$ | 0.30 |
| $\tilde{x}_4 < \tilde{x}_n \leq \tilde{x}_{max}$ | 0.35 |

The particular weighted probability value corresponding with each $\tilde{x}$ queue occupancy level, as well as the overall number of queue occupancy levels contained in the table, are predetermined by a network manager and stored in memory 108. The actual determination of these values can be based upon the past history of data transmission within the network, the particular level of service the network is desired to maintain, and/or any other arbitrary parameters that may be considered by the network manager.

Upon the reception of data packet n at switch 103 and in queue 111 of switching fabric 106, processor 107 compares the queue occupancy level $\tilde{x}_n$ of queue 111 to the queue level values of the logical table stored within memory 108, and retrieves the corresponding P value from that memory. Processor 107 then generates a random number between 0 and $\Sigma P$ (in the case of Table I, between 0 and 1). This generation may be performed through any one of a number of well know methods for generating uniformly distributed random or pseudo-random values employing a digital processor. The generated random number is then compared to the retrieved P value. If the P value is greater than the random number, processor 107 sets the FECN bit of the header for data packet n to a logical one; if the P value is less than the random number the FECN bit of the data packet n header is allowed to remain in an un-set state (logical zero). Obviously, the greater the value of P the, less chance there is of the randomly generated number being of a greater value than P. Consequently, the greater the value of P, the lower the chance of the FECN bit being set.

Data packet n, including the FECN header bit, is then transmitted along line 110 to recipient transceiver 102. Processor 105 extracts the FECN bit information from data packet n and embeds information reflecting the state of this bit into a feedback data packet. The feedback data packet is transmitted back to source transceiver 101 via network 100, thereby providing information to the source indicative of an estimated value of $\mu$ and $\tilde{x}_n$ for the present connection. Processor 104 within transceiver 101 extracts this information and, in response, adjusts the rate of data transmission, $\lambda_n$.

One preferred scheme for effecting an adjustment of $\lambda_n$ at source transceiver 101, sets the data rates as follows:

$\lambda_n = \lambda_{n-1} + A$, if the queue occupancy is below x*, and $$\lambda_n = \mu + \frac{x^* - \tilde{x}_n}{(gain)F}$$

for all other cases.

In the above equations the constant A and the value for gain are chosen by a network user to dynamically adjust the performance of the transmission network. F, the update frequency, represents the time interval over which processor 105 in recipient transceiver 102 calculates the service rate $\mu$ (i.e., the number bytes received during that interval). The quantity x* is a fixed target value for the size of the queue at switch 103 (as with A and gain, this value is chosen by the network user to adjust the performance of the data transmission network). Update frequency (F), and thus the time interval between the arrival of the (n−1)th and the nth feedback packet at source transceiver 101, may vary as a function of the number of cells or bytes transmitted via network 100 or, F may be fixed at constant value. Fixing F may be advantageous if the data being transmitted between the source and recipient has definite boundaries (such as the individual frames associated with video data). Although only transmission of data packets from transceiver 101 to transceiver 102 and transmission of feedback packets from transceiver 102 to transceiver 101 is described in detail, it will be apparent that a similar process is effected for the reverse direction of transmission.

Figure 2:
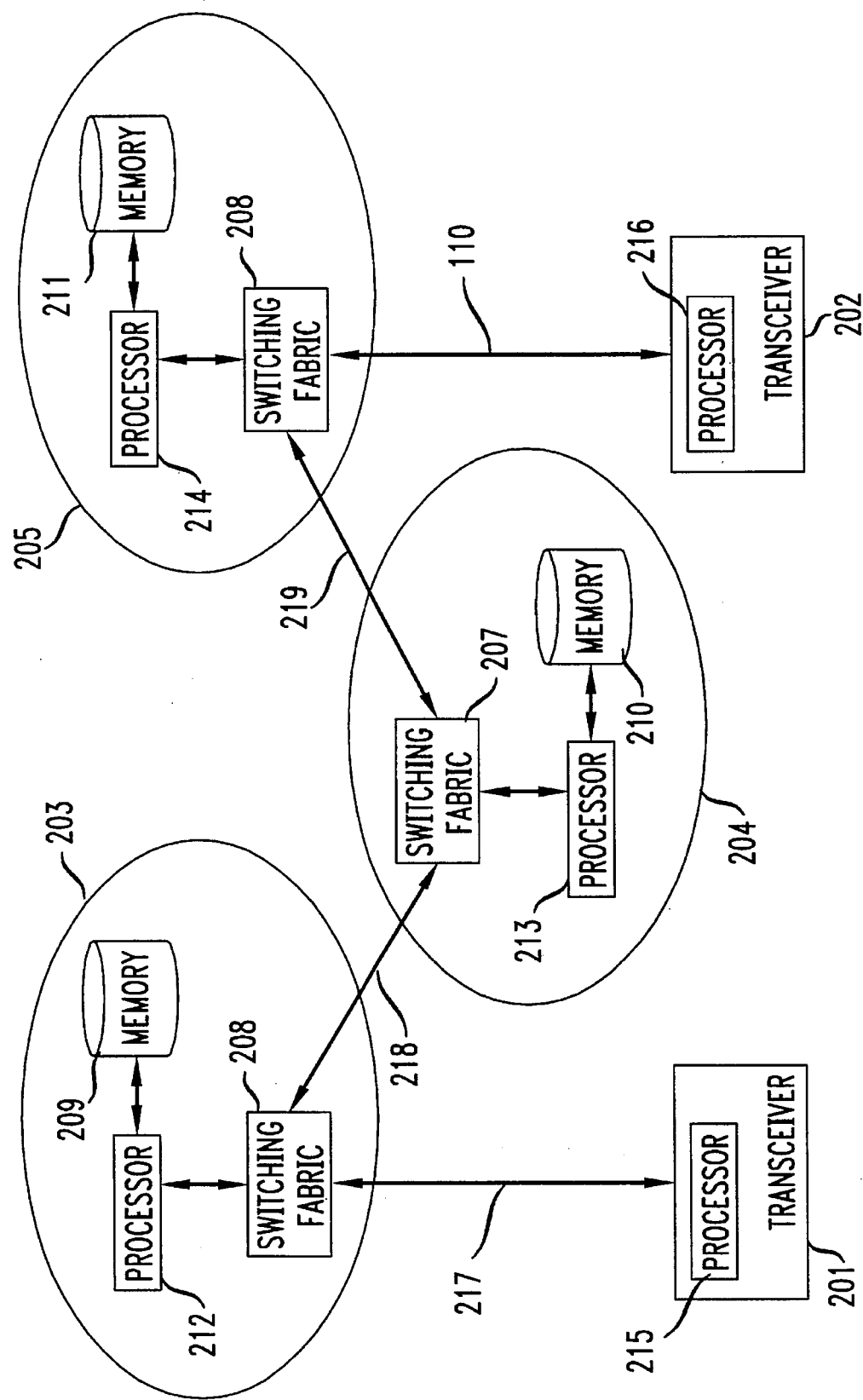
FIG. 2 is a simplified block diagram of an alternate ATM data transmission network that facilitates the practice of the invention.

FIG. 2 shows a simplified block diagram of an alternate ATM data transmission network, 200, that facilitates the practice of the invention. Network 200 operates in a manner that is very similar to that of network 100 (FIG. 1). However, within network 200 a single logical connection between source transceiver 201 and recipient transceiver 202 results in the routing of data through three programmable ATM switches (203,204 and 205). As is shown, each of the switches includes a switching fabric (206, 207, 208), a memory (209, 210, 211), and a processor (212, 213, 214). Each transceiver also includes a processor (215, 216).

A data packet, n, being sent from transceiver 201 along line 217 at a rate of $\lambda_n$. Packet n would arrive at switches 203, 204 and 205 at times $t_1$, $t_2$ and $t_3$, respectively. The amount of data waiting in the queue of switch 202 at time $t_1$ is $\tilde{x}_{n1}$; $\tilde{x}_{n2}$ represents the amount of data in the queue of switch 203 at $t_2$; and $\tilde{x}_{n3}$ is the amount of data in the switch 204 queue at time $t_3$.

As in the system of FIG. 1, a logical table associating increasing levels of queue occupancy with a range of weighted probability values, P, is stored within the each of the switch memories (209, 210, 211). Upon receipt of data packet n at switch 203, processor 212 compares the instantaneous queue occupancy level, $\tilde{x}_{n1}$ to the queue levels of the table stored in memory 209. Processor 212 then retrieves the corresponding P value from that memory, generates a random number between 0 and 1, and compares that random number to the retrieved P value. The value of the FECN bit within the header of data packet n is then set accordingly.

This process is repeated as the data packet n arrives at switch 204 and 205, and then data packet n is finally transmitted to recipient transceiver 202 via line 218. As a result, transceiver 202 is provided with statistically influenced information reflective of the queue level at the most crowded, or "bottleneck" switch between transceiver 201 and 202. For example, if switch 203 had a very crowded queue at time $t_1$, there would be a high probability that processor 212 would set the FECN bit within the header of data packet n to a logical one state. If data packet n then encountered very uncrowded queues at switches 204 and 205 (at times $t_2$ and $t_3$, respectively), it would be unlikely that the processors in those switches would be instructed to set the FECN bit of data packet n to a logical one as an indication of data crowding. However, the FECN bit would remain in the logical one state set by the processor of switch 203, and arrive at recipient transceiver 202 carrying information reflective of the queue level at the bottleneck switch.

Processor 216 within transceiver 202 would then extract the FECN bit information from data packet n, embeds information reflecting the state of this bit into a feedback data packet, and transmit the feedback data packet back to source transceiver 201 via network 200. Processor 215 within transceiver 201 can then responsively adjust the rate of data transmission, $\lambda_n$.

It will be understood that the particular systems and methods described are only illustrative of the principles of the present invention, and that various modifications could be made by those skilled in the art without departing from the scope and spirit of the present invention, which is limited only by the claims that follow.

One such modification would be applying the principles of the invention to a network having many more than three switches. Another would be applying the invention to a network wherein transmissions between transceivers are processed in a service disciple other than first-in-first-out, and/or a system where the setting of an FECN bit is accomplished by assigning it a value of logical zero. Yet another modification would be employing the invention in a system where feedback bits are set to a logical zero (as opposed to a logical one). The invention could also be practiced in systems where the processing and storage of queue occupancy ($\tilde{x}_n$) and weighted value (P) information is performed in a device other than a network switch (i.e., a transceiver or switch adjunct). In addition, the principle of the invention could be applied to systems where feedback bits are set in response to the determination of parameters other than queue occupancy (such as transmission rate or link utilization).

We claim:

1. A method for effecting single-bit feedback control within a data transmission system, comprising the steps of:

determining the instantaneous value of a particular varying parameter, for example, queue size, current transmission rate or link utilization;

retrieving a specific number P associated with the determined instantaneous value of said varying parameter, wherein P has a value between 0 and $P_{max}$;

generating a random number having a value that is uniformly distributed between 0 and $P_{max}$; and conditionally setting a feedback bit as a function of the comparative values of the generated number and the retrieved number P.

2. The method of claim 1 wherein the rate at which data is transmitted within said data transmission system is varied in response to the conditional setting of said feedback bit.

3. The method of claim 1 wherein said particular varying parameter is a measure of an instantaneous queue level at a particular location within said data transmission system.

4. The methods of claim 1 wherein said particular varying parameter is a measure of one or more data transmission rates within said data transmission system.

5. The method of claim 1 wherein said particular varying parameter is a measure of link utilization within said data transmission system.

6. The method of claim 1 wherein said feedback bit is conditionally set if the value of the generated random number exceeds the value of the retrieved number P.

7. The method of claim 1 wherein said specific number P is retrieved from a previously stored logical table.

8. A data transmission system employing single-bit feedback control, comprising:

a memory containing data representing a logical table of values between 0 and $P_{max}$ wherein each of said values is associated with a particular utilization level of a specific varying parameter, for example, queue size, current transmission rate or link utilization; and a data processor adapted to determine the instantaneous utilization level of said specific varying parameter, and in response to the determined instantaneous utilization level retrieve from said memory a specific number P associated with said determined instantaneous utilization level, wherein said data processor is further adapted to generate a random number having a value that is uniformly distributed between 0 and $P_{max}$ and conditionally set a feedback bit as a function of the comparative values of the generated random number the specific number P retrieved from said memory.

9. The invention of claim 8 wherein the rate at which data is transmitted within said data transmission system is varied in response to the conditional setting of said feedback bit.

10. The invention of claim 8 wherein said specific varying parameter is an instantaneous queue level at a particular location within said data transmission system.

11. The invention of claim 8 wherein said specific varying parameter is related to at least one rate of data transmission within said data transmission system.

12. The invention of claim 8 wherein said specific varying parameter is related to link utilization within said data transmission system.

13. The invention of claim 8 wherein said feedback bit is conditionally set if the value of said generated random number exceeds the value of the number P retrieved from said memory.

* * * * *